United States Patent
Devine et al.

(10) Patent No.: US 9,038,989 B2
(45) Date of Patent: *May 26, 2015

(54) BOOM MOUNTABLE ROBOTIC ARM

(71) Applicants: Clifford William Devine, Osoyoos (CA); Daniel Neil O'Connell, Oliver (CA)

(72) Inventors: Clifford William Devine, Osoyoos (CA); Daniel Neil O'Connell, Oliver (CA)

(73) Assignee: Quanta Associates, L.P.

( * ) Notice: Subject to any disclaimer, the term of this patent is extended or adjusted under 35 U.S.C. 154(b) by 0 days.

This patent is subject to a terminal disclaimer.

(21) Appl. No.: 14/083,374

(22) Filed: Nov. 18, 2013

(65) Prior Publication Data

US 2014/0069717 A1 Mar. 13, 2014

Related U.S. Application Data

(62) Division of application No. 13/555,835, filed on Jul. 23, 2012, now Pat. No. 8,585,020, and a division of application No. 12/451,492, filed on Nov. 16, 2009, now Pat. No. 8,226,069.

(30) Foreign Application Priority Data

May 16, 2007 (CA) ................. PCT/CA2007/000834

(51) Int. Cl.
*H02G 1/04* (2006.01)

(52) U.S. Cl.
CPC ............... *H02G 1/04* (2013.01); *Y10S 269/903* (2013.01)

(58) Field of Classification Search
CPC .......... H02G 1/04; H02G 1/02; B65H 57/14; H01R 4/64; B66D 3/046

USPC ........................ 254/134.3 PA, 134.3 R, 134.5; 248/289.31, 342, 288.11, 291.1; 182/2.1, 2.2, 2.3; 901/27; 414/680, 735

See application file for complete search history.

(56) References Cited

U.S. PATENT DOCUMENTS

| | | | | |
|---|---|---|---|---|
| 60,086 | A * | 11/1866 | Tay et al. | 248/291.1 |
| 800,636 | A * | 10/1905 | Fancher | 237/79 |
| 1,580,571 | A * | 4/1926 | Putzke | 254/418 |
| 2,001,034 | A * | 5/1935 | Lyman | 248/539 |
| 2,189,010 | A * | 2/1940 | Lewis | 414/680 |
| 2,662,730 | A * | 12/1953 | Crawford | 254/134.3 PA |
| 3,005,512 | A * | 10/1961 | Vogan | 182/2.4 |
| 3,043,394 | A * | 7/1962 | Hall | 182/2.4 |
| 3,631,939 | A * | 1/1972 | Johnson et al. | 182/2.4 |
| 4,353,399 | A * | 10/1982 | Harris | 144/2.1 |
| 4,836,486 | A * | 6/1989 | Vossoughi et al. | 248/281.11 |
| 4,838,381 | A * | 6/1989 | Michaud et al. | 182/2.3 |
| 4,852,856 | A * | 8/1989 | Correll | 254/134.3 R |
| 4,917,343 | A * | 4/1990 | Wainscott | 248/447.2 |

(Continued)

FOREIGN PATENT DOCUMENTS

EP 1030321 A1 * 8/2000 ............... H01G 2/18

Primary Examiner — George Nguyen
(74) Attorney, Agent, or Firm — Anthony C. Edwards

(57) ABSTRACT

A boom mountable robotic arm for temporarily supporting an elongate conductor includes a rigid member such as a beam or beam assembly adapted for mounting onto the upper end of a boom for example using a boom adaptor, at least one electrically insulated support post mounted to the rigid member, where each post temporarily supports an elongate electrical conductor, and at least two rotation devices for selectively controllable rotation of the rigid member and the electrically insulated support posts about at least two corresponding axes of rotation.

15 Claims, 11 Drawing Sheets

(56) References Cited

U.S. PATENT DOCUMENTS

| | | | |
|---|---|---|---|
| 5,014,863 A * | 5/1991 | Vlaanderen | 212/299 |
| 5,054,725 A * | 10/1991 | Bucefari et al. | 248/123.11 |
| 5,076,449 A * | 12/1991 | Clutter | 212/283 |
| 5,193,897 A * | 3/1993 | Halsey | 362/118 |
| 5,268,591 A * | 12/1993 | Fujimoto | 307/9.1 |
| 5,587,637 A * | 12/1996 | Ohyama | 318/568.11 |
| 5,601,270 A * | 2/1997 | Chen | 248/454 |
| 5,791,639 A * | 8/1998 | Johnston et al. | 269/41 |
| 5,909,864 A * | 6/1999 | Wang | 248/289.11 |
| 5,918,845 A * | 7/1999 | Whitaker | 248/288.11 |
| 5,941,507 A * | 8/1999 | Page | 254/134.3 PA |
| 5,944,138 A * | 8/1999 | Vollmer et al. | 182/2.1 |
| 5,967,479 A * | 10/1999 | Sweere et al. | 248/280.11 |
| 6,082,552 A * | 7/2000 | Pollock et al. | 211/18 |
| 6,095,468 A * | 8/2000 | Chirico et al. | 248/282.1 |
| 6,702,130 B1 * | 3/2004 | Carlilse | 211/204 |
| 6,948,701 B2 * | 9/2005 | Knoerzer et al. | 254/134.3 FT |
| 6,978,570 B1 * | 12/2005 | Clark et al. | 43/27.4 |
| 7,216,850 B2 * | 5/2007 | Kwon | 254/395 |
| 2001/0016087 A1 * | 8/2001 | Akiyama et al. | 384/17 |
| 2005/0189527 A1 * | 9/2005 | Young | 254/134.3 R |
| 2006/0182595 A1 * | 8/2006 | Lundstrom et al. | 414/695.8 |
| 2008/0224108 A1 * | 9/2008 | O'Connor | 254/134.5 |
| 2009/0095522 A1 * | 4/2009 | Barthold | 174/40 TD |
| 2010/0133490 A1 * | 6/2010 | Devine et al. | 254/134.3 PA |
| 2010/0237211 A1 * | 9/2010 | Vigil | 248/291.1 |

* cited by examiner

BOOM MOUNTABLE ROBOTIC ARM

CROSS-REFERENCE TO RELATED APPLICATIONS

This is a divisional application of U.S. patent application Ser. No. 13/555,835 which is a divisional application of U.S. patent application Ser. No. 12/451,492, now U.S. Pat. No. 8,226,069, which is a National Phase entry application from PCT/CA2007/000834 filed May 16, 2007.

FIELD OF THE INVENTION

This application relates to a robotic arm for temporarily supporting and repositioning energized power lines in general and in particular to a robotic arm having at least one selectively alignable elongate conductor retainer supported thereon.

BACKGROUND OF THE INVENTION

High voltage transmission and distribution lines are typically strung between a series of spaced-apart support towers or poles. The conductors are connected to electrically insulated support posts mounted on or suspended from crossarms extending at the upper end of transmission or distribution poles, or conductor support points built into transmission towers. Periodically it is necessary to replace or repair the poles or towers, crossarms and electrically insulated support posts to maintain the electrical circuit in good working order. It is preferable if this maintenance and repair work can be performed without de-energizing the conductors in order to avoid an interruption of service to consumers, or to avoid the power company having to purchase power from an alternative source, or other system disruptions.

Hot line repair work, as it is commonly referred to in the trade, is a potentially hazardous undertaking. Safety regulations require that linemen maintain a minimum work clearance or "limit of approach" from energized conductors. The limit of approach varies depending upon the voltage of the conductors in question.

Conventional procedures used by linemen to temporarily support energized conductors in order to enable repair of damaged or obsolete components involve the use of insulated wire tongs, lift poles and rope blocks in labour-intensive, complex rigging arrangements. Conventional fiberglass insulated tools are limited to use only in good weather. Any accumulation of moisture which may impair their insulating property requires that the job be stopped, and that the conductors be placed in an insulator which is rated for all-weather use.

Several auxiliary crossarms have also been proposed in the past for temporarily supporting conductors, thereby reducing the need for labour-intensive "stick work" by linemen. For example, U.S. Pat. No. 4,973,795, which issued to Sharpe on 27 Nov. 1990, relates to an auxiliary crossarm consisting of an insulated boom fitted with polymer electrically insulated support posts and conductor hooks for releasably engaging energized conductors. The Sharpe boom is suspended from a crane above the transmission lines to be serviced.

Auxiliary crossarms for temporarily lifting and supporting energized conductors from below are also well known. Such crossarms typically have sleeves which are connectable to the boom jibs of derrick or bucket trucks.

Utility companies often find it convenient to string both transmission lines and distribution lines on the same pole or tower. The distribution lines are usually suspended between four to twelve feet below the transmission lines. This makes it very difficult or impossible to safely raise prior art boom-mounted auxiliary crossarms to a position immediately beneath the transmission lines in order to provide temporary support to the lower-mounted distribution conductors.

Another limitation of prior art designs was that they did not permit pivotal movement of the auxiliary crossarm relative to the boom of a service vehicle. A limited range of pivotal movement was desirable to easily facilitate conductor capture, to enable insertion of the crossarm between upper and lower-mounted conductors and to allow for relocation of conductors to different final configurations (such as from triangular to flat spacing and vice versa). The capacity to control pivotal movement of the crossarm also helps to compensate for the angle, relative to the tower proximate to which the service vehicle is parked and ensures that the arm can be made level irrespective of the boom angle. Consequently, applicants invented the subject of U.S. Pat. No. 5,538,207 which issued Jul. 23, 1996, and which forms part of the present specification and which is incorporated by reference also.

A further limitation of prior art boom-mounted auxiliary arms is that all of the conductors move together as a unit as the truck boom or overhead crane is adjusted. That is, operators are not able to independently control the motion of each separate conductor in order to maximize lineman working clearances or to relocate the conductors to a different spacing configuration.

A further limitation of the prior art boom-mounted arms is that the positional control of the distal ends of the attached electrically insulated support posts and therefore position wire holders or other wire interfaces is determined by the position of the boom and the robotic arm as a whole. This limits the degree to which a distal end of an insulator may be positioned as the remoteness of the distal end of the insulator relative to the adjustor controlling the boom or robotic arm may be great.

Accordingly, the need has arisen for a boom-mountable robotic arm for temporarily supporting energized conductors which enables the distal end of the insulator for supporting the conductor to be accurately positioned independently of the positioning of the boom or robotic arm.

SUMMARY OF THE INVENTION

In summary, the boom mountable robotic arm according to the present invention for temporarily supporting an elongate conductor may be characterized in one aspect as including a rigid member such as a beam or beam assembly adapted for mounting onto the upper end of a boom for example using a boom adaptor, at least one electrically insulated support post mounted to the rigid member, where each post temporarily supports an elongate electrical conductor, and at least two rotation devices or means for selectively controllable rotation of the rigid member and the electrically insulated support posts about at least two corresponding axes of rotation. A first axis of rotation of the two rotation devices or means is chosen from the group including:

a) a substantially vertical axis of rotation orthogonal to the rigid member for rotation of the rigid member about the substantially vertical axis in a substantially horizontal plane and relative to the boom, b) at least one axis of rotation extending along a longitudinal axis of the rigid member, for rotation of the electrically insulated support posts relative to and substantially laterally of the rigid member, c) at least one axis of rotation extending substantially laterally across the rigid member for rotation of the electrically insulated support posts relative to and substantially along the rigid member.

A second axis of rotation of the two rotation devices or means extends laterally of, and between, the rigid member and the upper end of the boom for rotation of the rigid member relative to the boom in a substantially vertical plane so as to level the rigid member.

In embodiments employing a boom adaptor, the boom adaptor is mountable to the upper end of the boom. The rigid member may be an elongate upper beam assembly rotatably mounted to the boom adaptor for rotation of the upper beam assembly about the second axis of rotation relative to the boom adaptor, the upper beam assembly supporting thereon the electrically insulated support posts and having a conductor retainer mounted at a distal end thereof distal from the upper beam assembly.

In a preferred embodiment, the second of the two rotation devices or means includes a selectively actuable leveling adjustor mounted between the upper beam assembly and the boom adaptor for selectively adjusting an angular position of the upper beam assembly relative to the boom adaptor.

In one embodiment the first of the two rotation devices or means includes an actuator cooperating between the upper beam assembly and the electrically insulated support posts for selective inclination of the electrically insulated support posts relative to the upper beam assembly. In a further embodiment the first of the two rotation devices or means may be a pivotal connection means between the upper beam assembly and the boom adaptor for pivoting of the upper beam assembly and the electrically insulated support posts mounted thereon relative to the boom adaptor about the substantially vertical axis of rotation.

In one embodiment the electrically insulated support posts are mounted by a hinge means to the upper beam assembly. For example, in one embodiment the electrically insulated support posts may be mounted by at least one hinge to the upper beam assembly along the at least one axis of rotation extending along the longitudinal axis of the upper beam assembly. Alternatively, the electrically insulated support posts may be mounted by at least one hinge to the upper beam assembly along the at least one axis of rotation extending substantially laterally across the upper beam assembly. The hinges or hinge means may be oriented for rotation relative to the upper beam assembly about a combination of longitudinal and transverse axes or axes aligned between longitudinal and transverse on a single upper beam assembly as may be useful, or called for.

In one embodiment the hinge or hinge means include a hinge plate having a plurality of bores therein for securing a plurality of electrically insulated support posts thereto. In other embodiments, the hinge or hinge means may include a hinge plate having a fastener for securing the hinge plate in an operating position in which the electrically insulated support posts extend perpendicularly away from the upper beam assembly. In one embodiment some or all of the electrically insulated support posts may include an insulated upright portion and a riser portion, where the riser portion has a first end pivotably connected to the upper beam assembly and a second end supporting the insulated upright portion, and where the actuator angularly extends from the second end of the riser portion or the distal end of the insulated post to the upper beam assembly.

In the embodiment where the upper beam assembly rotates relative to the boom adaptor about a substantially vertical axis of rotation, the upper beam assembly and pivotal connection means may further include a base member and a rotatable member operable to support the electrically insulated support posts. The base member may have first and second spaced apart end connections and an upwardly disposed pivot platform therebetween. The pivot platform pivotally supports the rotatable member thereon. Rotation of the rotatable member selectively orients the electrically insulated support posts relative to the base member.

In an alternative embodiment, one or more interruptible electrical conductors, each having first and second ends, are supported on the ends of a corresponding plurality of electrically insulated support posts which support the interruptible conductors away from the manipulator arm. Advantageously one electrically insulated support post may be rotatable relative to the upper beam assembly. The selectively interruptible conductors may include a stationary conductor between free distal ends of first and second electrically insulated support posts and a rotatable conductor extending from the free distal end of the second post and being selectively connectable to a distal end of a third electrically insulated support post.

In yet a further embodiment, a base member may be mountable to a distal end of one of the electrically insulated support posts. A pivotable support plate is pivotally mounted on the base member. The pivotable support plate is adapted for mounting of at least one electrical conductor retainer thereto. The pivotable support plate may be adapted for pivotally supporting the electrical conductor retainers thereon for rotation of the electrical conductor retainers relative to the pivotable support plate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The drawings illustrate embodiments of the invention wherein similar characters of reference denote corresponding parts in each view.

FIG. 1 is an isometric view of a robotic arm mounted on the boom of a service vehicle for temporarily supporting transmission and distribution conductors extending between transmission towers.

FIG. 2 is a side elevational view of the robotic arm of FIG. 1 with one telescoping arm retracted and the other telescoping arm extended.

FIG. 3 is a side elevational view of the robotic arm of FIG. 2 with both telescoping arms extended.

FIG. 4 is a side elevational view of the robotic arm of FIG. 2 illustrating the range of angular motion of the upper frame relative to the boom.

FIG. 5 is a side elevational view of the robotic arm of FIG. 2 with the telescoping arms fully retracted to releasably engage three spaced transmission conductors.

FIG. 6 is a side elevational view of the robotic arm of FIG. 5 with the telescoping arms extended to increase the spacing between the transmission conductors, and with the boom of the service vehicle extended to increase the elevation of the conductors.

DETAILED DESCRIPTION OF EMBODIMENTS OF THE INVENTION

Figure 1:
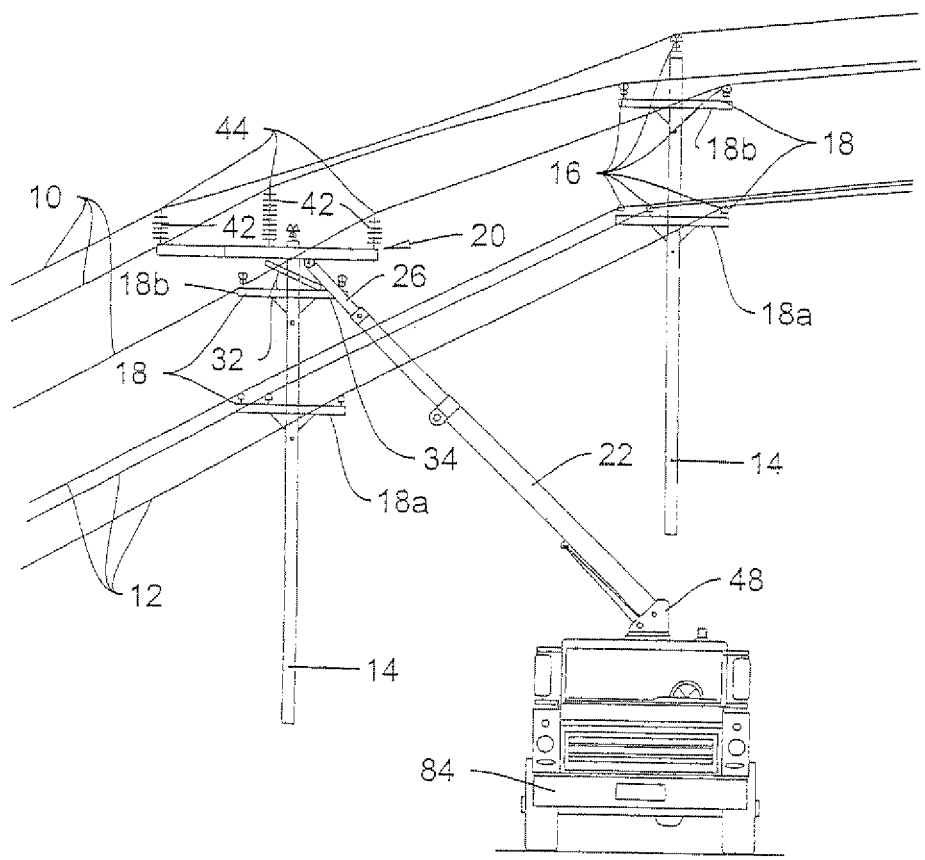
FIGS. 1-6 are views taken from applicant's prior U.S. Pat. No. 5,538,207.

Referring to FIG. 1, elongate conductors 11 such as for example transmission lines 10 and distribution lines 12 are typically strung between a series of spaced-apart support towers or poles 14. Transmission lines 10 and distribution lines 12 are connected to insulators 16 mounted on crossarms 18 extending at the upper end of towers 14.

Transmission lines 10 typically transmit electricity between locations at voltages between 69 and 765 kV as opposed to the lower voltages typically used for secondary or distribution lines. Such transmission lines 10 are therefore required to be of a relatively large size and may present loads of up to 7500 pounds or more that must be supported by the insulators 16 and crossarms 18 or by any temporary support device as described further below.

In order to minimize electromagnetic effects, transmission lines 10 are often strung in a triangular formation with the centre conductor extending above the two outside conductors. Often both transmission and distribution phases are supported by the same support towers 14. In this case, the lower crossarm 18a supporting the distribution line conductors 12 may be suspended approximately four to twelve feet below the upper crossarm 18b as illustrated in FIG. 1.

In order to maintain electrical circuits in good working order, the support towers 14, insulators 16, and crossarms 18 must be periodically replaced or repaired. It is preferable if the necessary maintenance work can be completed without the need to de-energize the electrical circuit in question in order to avoid disruption to customers.

Figure 2:
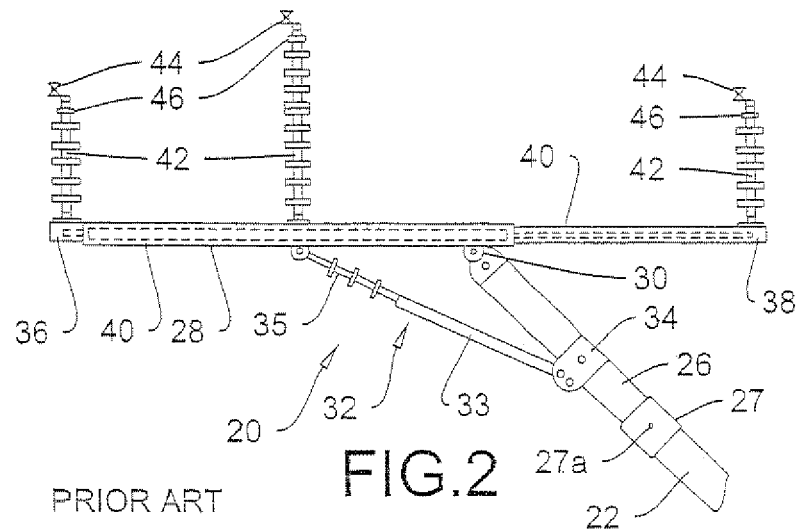

The present invention relates to a robotic arm 20 specially adapted for servicing energized electrical circuits. As shown in FIG. 2, robotic arm 20 is mountable on the boom 22 of a service vehicle 24 by means of a boom adaptor 26. Boom adaptor 26 preferably consists of an insulated sleeve, approximately five to six feet in length, which fits tightly over the upper end of boom 22 and is secured in place with a steel collar 27. The collar is held in place with a steel pin 27a and locked with a keeper key.

Boom adaptor 26 also preferably includes an insulated fiberglass section to electrically isolate robotic arm 20 from the ground. This permits the use of non-insulated booms 22. As discussed further below, the entire robotic arm 20 may be shrouded by an insulating material in an alternative embodiment.

Figure 3:
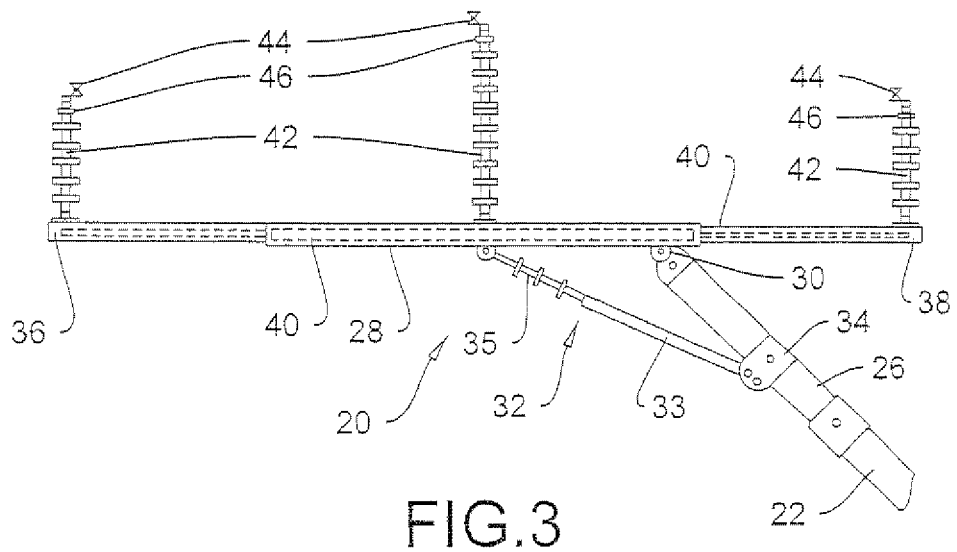

An upper beam assembly 28, which preferably consists of an elongated tube, is connected to the end of boom adaptor 26 by means of a pivot joint 30. As illustrated in FIGS. 2 and 3, boom adaptor 26 is connected to an end portion of upper beam assembly 28. In an alternative embodiment, boom adaptor 26 may be connected to a central portion of upper beam assembly 28.

Figure 4:
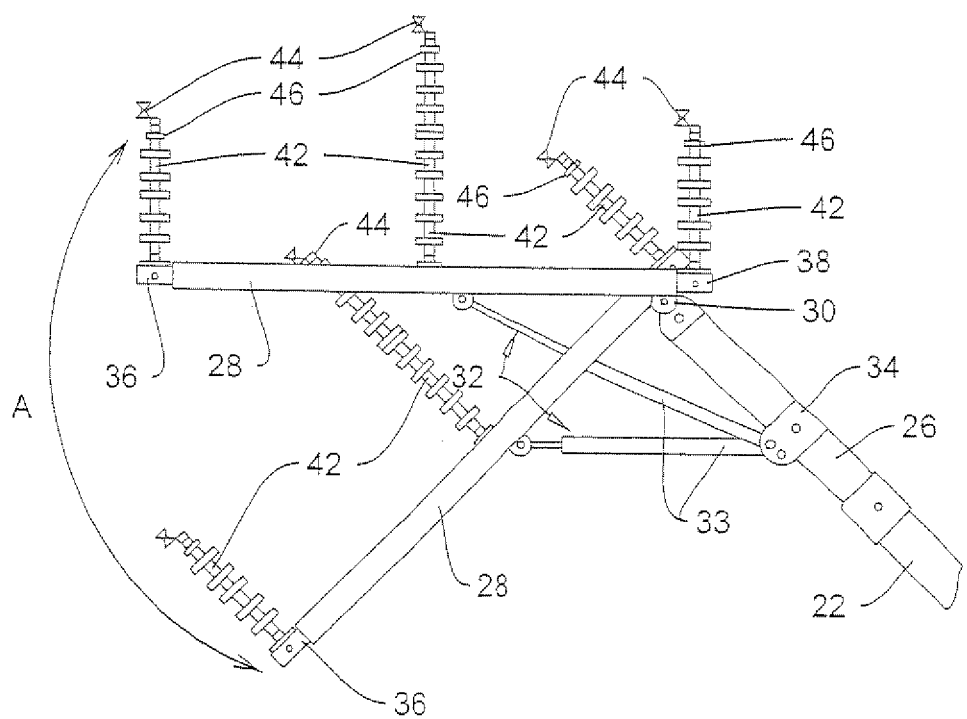

A used herein, "adjustment means" includes but is not necessarily limited to an adjustable length leveling actuator 32 which extends between boom adaptor 26 and upper beam assembly 28. Leveling actuator 32 adjusts the angular position of upper beam assembly 28 relative to the adaptor 26 within approximately a 40 to 50 degree range of motion A as illustrated in FIG. 4. Extension and retraction of leveling actuator 32 is actuated by a hydraulic cylinder 33. Optionally, a polymer insulator 35 may also be mounted on leveling actuator 32 as illustrated in FIGS. 2 and 3. Leveling actuator 32 is coupled to boom adaptor 26 by means of collar 34.

Figure 5:
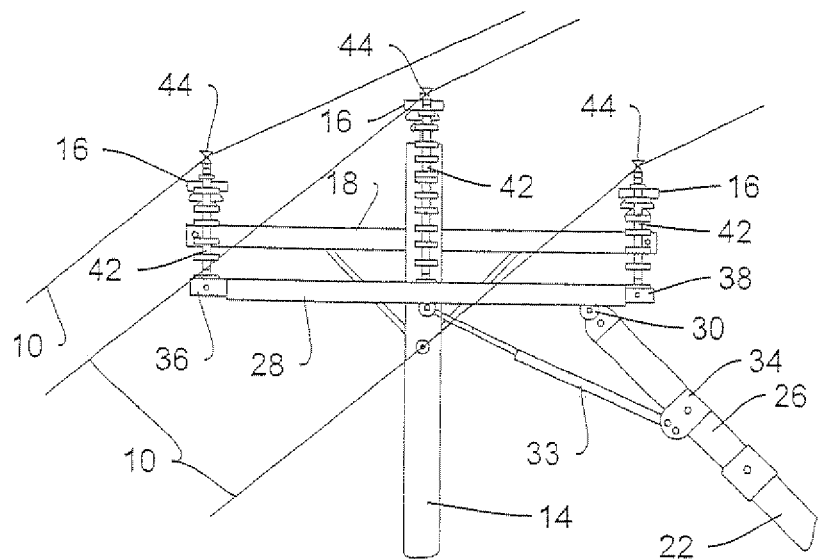

Robotic arm 20 further includes first and second telescoping arms 36, 38 which are telescopically coupled to opposite ends of upper beam assembly 28. As discussed further below, each telescoping arm 36, 38 is independently adjustable between a refracted position and an extended position coaxial with upper beam assembly 28. As illustrated in FIG. 2, telescoping arm 36 may be retracted while telescoping arm 38 is extended and visa-versa. Both of telescoping arms 36 and 38 may be extended as illustrated in FIG. 3 or both may be retracted as illustrated in FIGS. 4 and 5. Movement of telescoping arms 36, 38 is preferably independently actuated by hydraulic cylinders 40 (shown in dotted outline in FIGS. 2 and 3) housed within upper beam assembly 28. Alternatively, threaded rods powered by hydraulic, pneumatic or electric motors, worm gears, or other suitable mechanical actuators may also be provided as will be appreciated in the art.

A series, such as the illustrated parallel array of electrically insulated support posts 42, are mounted on the upper surface of upper beam assembly 28 and telescoping arms 36, 38. A conductor retainer 44 may be mounted at the upper end 46 of each electrically insulated support post 42 for releasably coupling robotic arm 20 to corresponding energized conductors, such as for example transmission lines 10. Elongate conductor retainers are know in the art such as for example as described in applicants' U.S. Pat. No. 5,538,207 issued Jul. 23, 1996 and incorporated herein by reference. As should be apparent to someone skilled in the art, the number of electrically insulated support posts 42 and elongate conductor retainer 44 required would depend upon the number of transmission and/or distribution conductors required to be supported. Further, the length of electrically insulated support posts 42, and the coupling together of more than one electrically insulated support post 42, is determined by the mechanical arrangement of the elongate conductors 11 and the voltage level at which they are operating.

As discussed above, the centre conductor of a three phase transmission line often extends above the two outside conductors. Accordingly, the electrically insulated support post 42 mounted on upper beam assembly 28 may advantageously be longer in length than the electrically insulated support posts mounted on telescoping arms 36, 38 as illustrated in FIG. 3, or consist of two such electrically insulated support posts 42 bolted together end-to-end. Polymer insulators 35 and 42 preferably consist of station class polymer electrically insulated support posts which are rated for all weather use.

Robotic arm 20 may advantageously be constructed from a nonconducting material such as KEVLAR™ or pultruded fiberglass by way of non-limiting example rather than structural steel. This would lessen the overall weight of robotic arm 20 and would allow for the use of shorter electrically insulated support posts 42 and a shorter insulated boom adaptor 26 (since the non-conductive material would contribute to the overall insulating capacity of arm 20). Shorter electrically insulated support posts 42 are desirable to lessen the overall height of robotic arm 20 which is of particular importance when servicing elongate conductors 11 with underbuild below. A shorter boom adaptor 26 is desirable so as to more easily keep within the weight bearing rating and capacity of the truck-mounted boom 22.

Robotic arm 20 should preferably have a lifting capacity of not less than 800 lbs per transmission line phase. Smaller, lighter robotic arms 20 with less lifting capacity would be suitable for servicing lower voltage distribution circuits which often consist of lower weight conductors than transmissions circuits.

In operation, robotic arm 20 is first mounted on boom 22 of service vehicle 24 as described above. The hydraulic hoses (if any) are then connected to the auxiliary hydraulic port of service vehicle 24. Service vehicle 24 is typically parked immediately underneath or adjacent to the support tower 14 to be serviced. The truck boom 22 is extended to position arm 20 underneath the corresponding energized elongate conductors 11 as illustrated for example in FIG. 1. If necessary, boom 22 may be rotated about the turret 48 of service vehicle 24 until the desired angular position is reached.

Depending upon the angle of boom 22 it may be necessary to actuate hydraulic leveling cylinder 33 until the upper beam assembly 28 of arm 20 rotates about pivot joint 30 to a position immediately underneath and parallel to crossarm 18. For example, if service vehicle 24 is parked a short distance away from the bottom of tower 14, then some adjustment will be necessary to ensure that upper beam assembly 28 of arm 20 is level with crossarm 18, irrespective of the angle of truck boom 22. As shown in FIG. 5, in the level position, electrically insulated support posts 42 mounted on upper beam assembly 28 and on telescoping arms 36, 38 are positioned immediately underneath corresponding elongate conductors 11.

Figure 6:
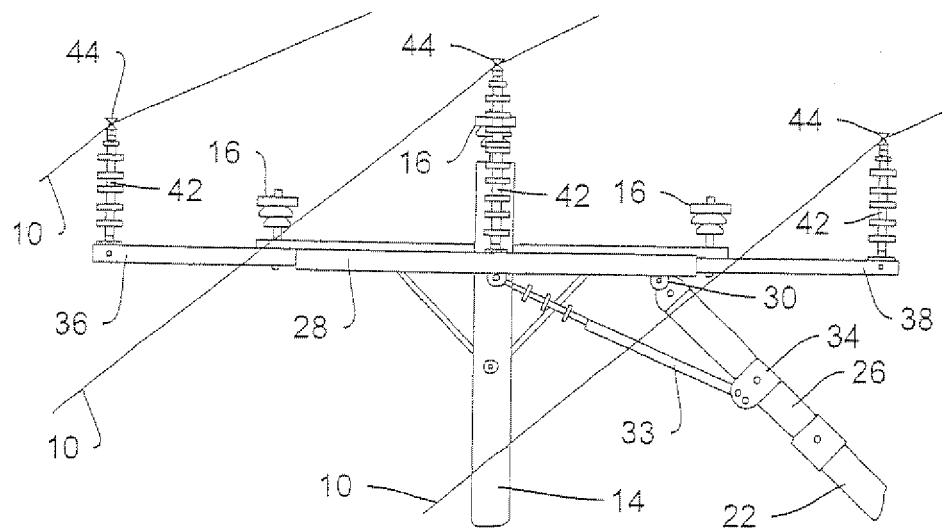

Once boom 22 has been extended to the position shown in FIG. 6, linemen working on tower 14 may then place each energized elongate conductors 11 into a corresponding elongate conductor retainer 44 mounted at the upper end of each electrically insulated support post 42. Each elongate conductor retainer 44 is first positioned proximate to a corresponding elongate conductor 11. Elongate conductor retainer 44 are then adjustably oriented or aligned by one of the methods described below either by rotation relative to the insulated support post 42 or by rotating the insulated support post relative to the upper beam assembly 28.

Once elongate conductors 11 are securely captured within a corresponding elongate conductor retainer 44, the lineman manually unties elongate conductors 11 from the insulator 16 mounted on the tower crossarm 18. Elongate conductors 11 may then be raised well above tower 14 by extending boom 22. Additionally, the outside electrically insulated support posts 42 may be extended laterally away from tower 14 by extending telescoping arms 36, 38 as shown in FIG. 6. Extension of each telescoping arm 36, 38 is independently controllable by independent actuating hydraulic cylinders 40. The distance between phases may be extended from six feet to for example fourteen or fifteen feet to provide linemen with safe working clearances even in the case of high voltage lines, for example greater than 100 kV.

Robotic arm 20 temporarily supports the weight of elongate conductors 11 to enable servicing or replacement of conductor support structures, such as tower 14, insulators 16 or crossarm 18 by the linemen. After the required line maintenance has been completed, hydraulic cylinders 40 are actuated by the operator to retract telescoping arms 36, 38 and thereby return the outer electrically insulated support posts 42 to their original position. The truck boom 22 may then be lowered, if necessary, until upper beam assembly 28 is positioned slightly below the level of crossarm in 18. The elongate conductors 11 are then retied by the linemen to the tower insulators 16 and the conducting holder latching mechanism of retainers 44 opened to complete the servicing procedure.

Robotic arm 20 may also find application in providing temporary mid-span support for elongate conductors 11 in addition to transmission tower servicing.

Figure 11:
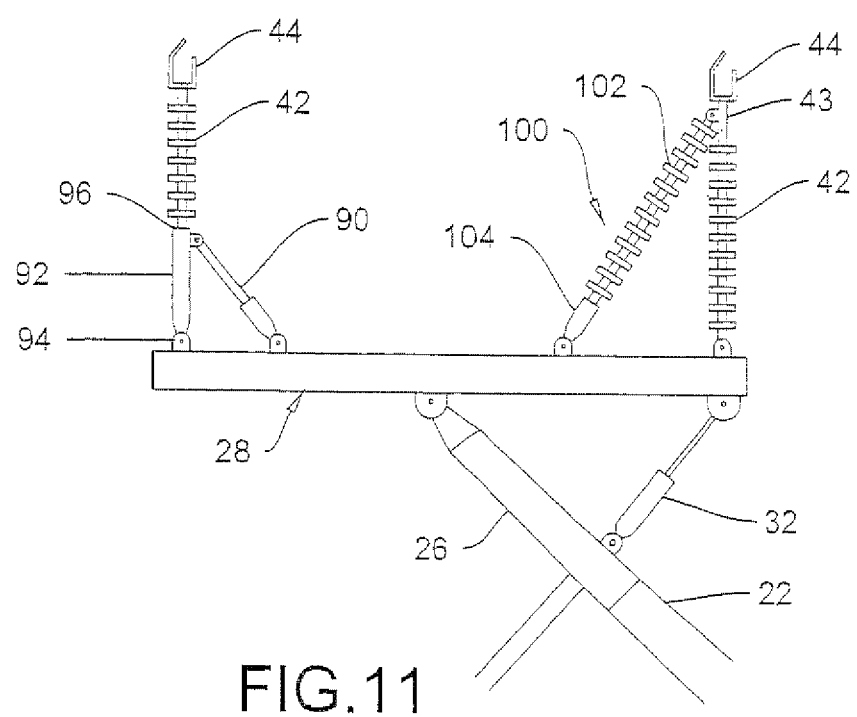
FIG. 11 is a side elevational view of a robotic arm of FIG. 2 having an actuator for angularly adjusting the orientation of the electrically insulated support post according to further embodiments of the present invention.

As seen in FIG. 11, the electrically insulated support posts 42 include distal ends 43. In one embodiment posts 42 may be selectively oriented relative to a portion of the upper beam assembly. According to a first embodiment of the present invention, the elongate conductor retainers 44 may be fixedly secured to upper ends 43 of the electrically insulated support posts 42.

Figure 7:
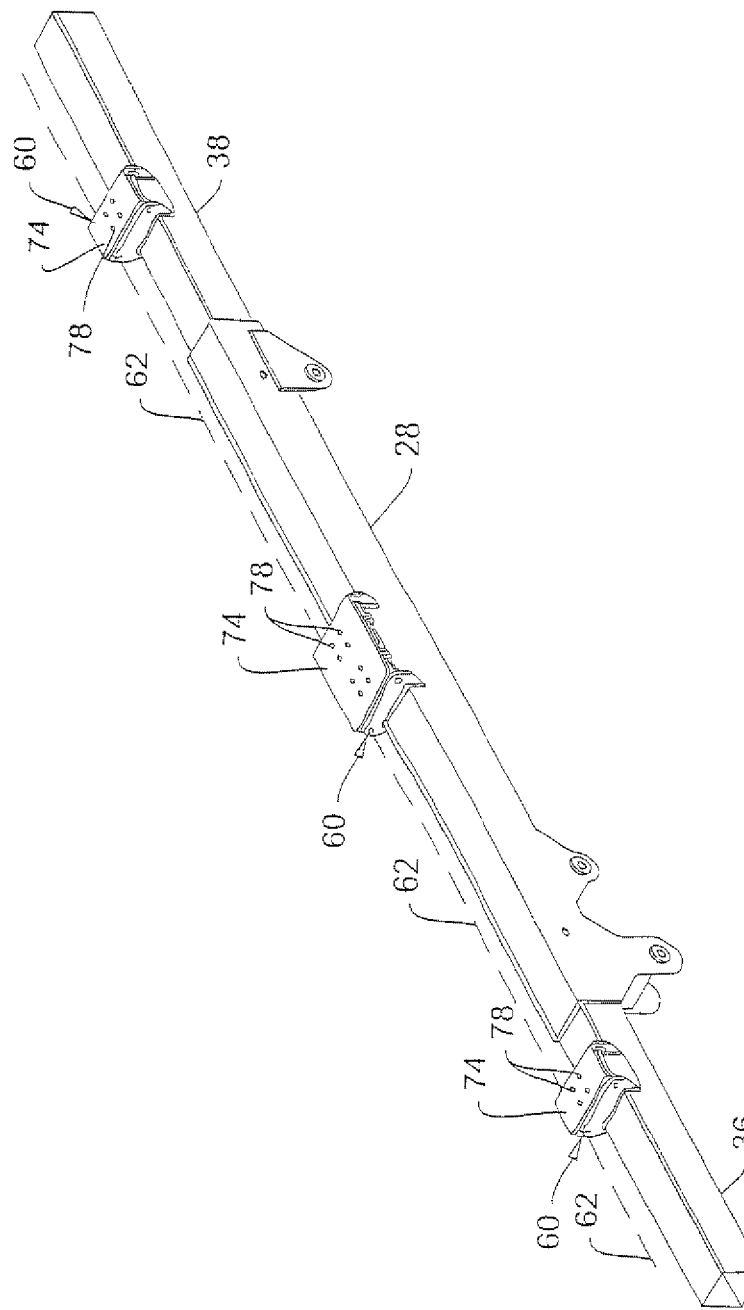
FIG. 7 is an isometric perspective view of an upper beam assembly of the robotic arm of FIG. 2 having hinge joints for connecting the electrically insulated support posts according to a first embodiment of the present invention.
Figure 8:
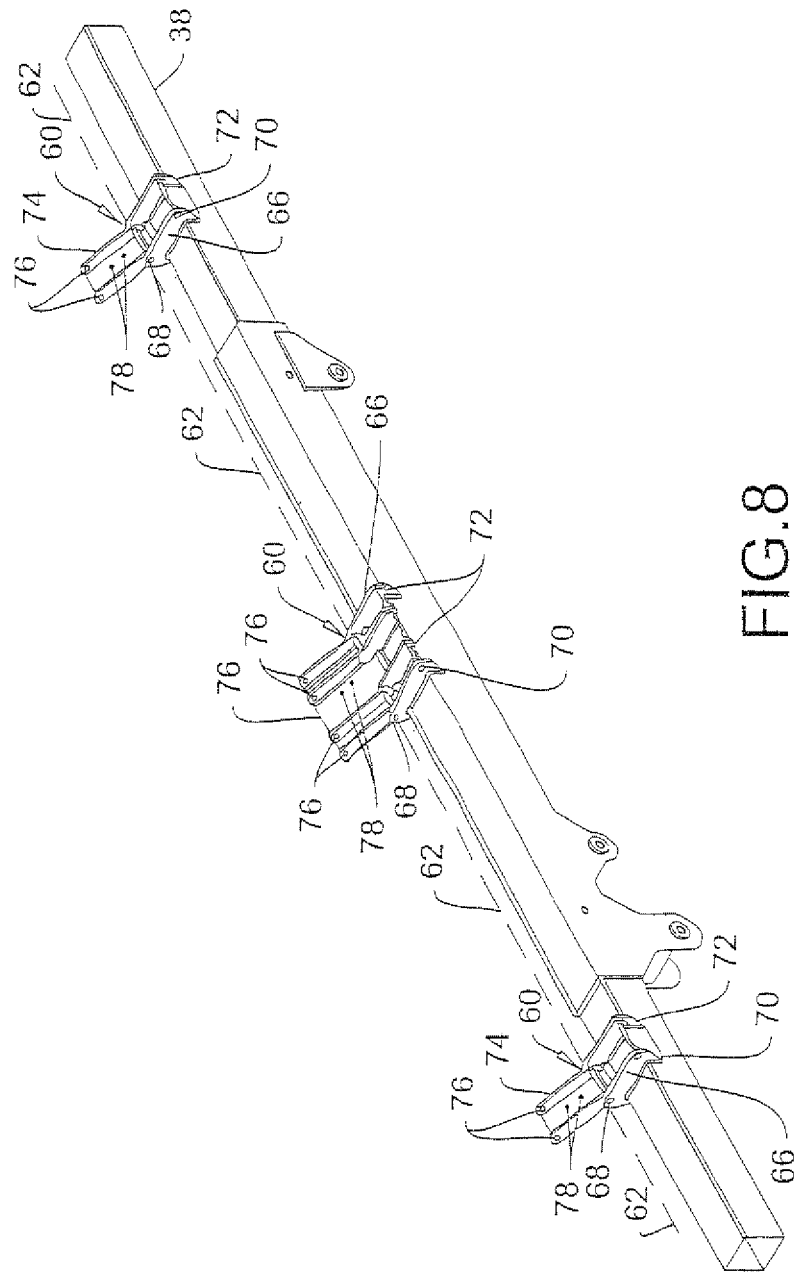
FIG. 8 is an isometric perspective view of an upper beam assembly of FIG. 7 showing the hinge joints in the open position.
Figure 9:
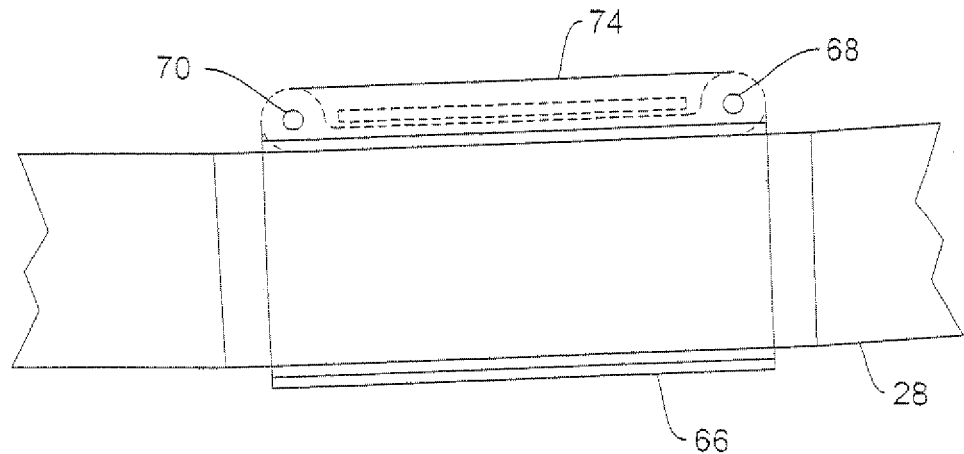
FIG. 9 is a side elevational view of an upper beam assembly of FIG. 2 showing the hinge joints having axes transverse to the upper beam assembly according to a further embodiment of the present invention.
Figure 10:
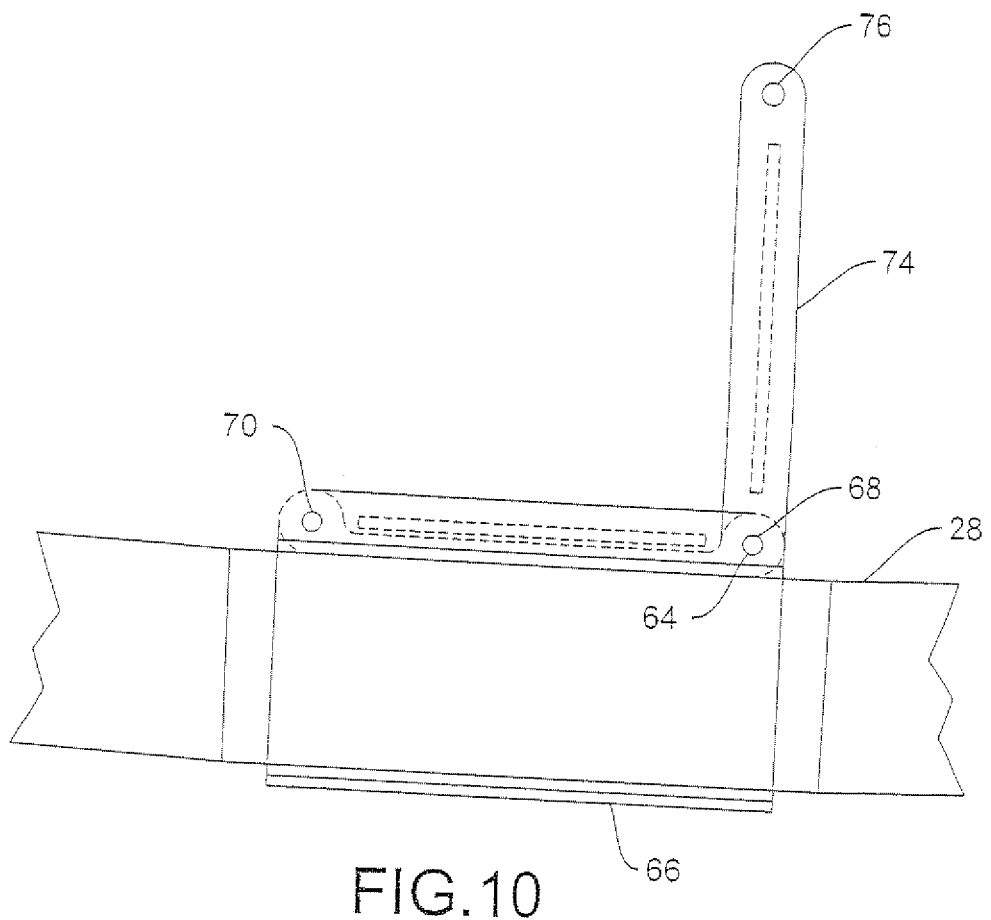
FIG. 10 is a side elevational view of an upper beam assembly of FIG. 9 showing the hinge joints in the open position.

As seen in FIGS. 7 and 8, the electrically insulated support post 42 may be connected to hinge joints 60 so as to be hinged to the robotic manipulator arm and in particular upper beam assembly 28 for rotation about axes 62. The hinge joints may be parallel to the longitudinal axis of the upper beam assembly 28. Alternatively, as illustrated in FIGS. 9 and 10, the hinge joints 60 may be hinged to the upper beam assembly 28 along axes 64 transverse to the longitudinal axis of the upper beam assembly.

The upper beam assembly 28 may include a hinge mounting bracket 66 secured to a top surface thereof. The hinge mounting bracket 66 includes first and second spaced apart sets of aligned hinge bores 68 and 70, respectively for passing corresponding pins 72 therethrough. The first and second sets of hinge bores 68 and 70 are parallel to each other. A hinge plate 74 having connection bores 76 corresponding to the first and second sets of hinge bores 68 and 70 of the hinge mounting bracket 66 is secured to the hinge mounting bracket bypassing corresponding pins 72 therethrough. As illustrated, the hinge plate 74 includes a plurality of mounting bores 78 for securing two electrically insulated support posts 42 thereto. It will be appreciated, however, that the hinge plate 74 may also be constructed such that it may have one or a plurality of electrically insulated support posts 42 secured thereto as well. The hinge plate 74 may be rotated relative to the hinge mounting bracket 66 by removing one of the pins 72 thereby enabling the hinge plate 74 and ifs attached electrically insulated support post 42 away from the decoupled set of bores. Rotation of the electrically insulated support post 42 away from their vertically upright positions facilitates transportation of the robotic arm 20 as well as facilitating the insertion of the robotic arm through small openings.

As illustrated in FIG. 11, the electrically insulated support post 42 may be angularly adjustable relative to the upper beam assembly 28 by means of an adjusting actuator such as for example actuators 90 or 104. In the former embodiment, the electrically insulated support post 42 may be mounted to the top of an axially aligned riser 92. The riser 92 includes a first end 94 pivotally connected to the upper beam assembly 28 and a second end 96 axially supporting the electrically insulated support post 42. The adjusting actuator 90 angularly extends from the second end 94 of the riser 92 to the upper beam assembly 28.

In the alternative latter embodiment, the electrically insulated support post 42 may also include an insulated adjusting driver 100 having an electrically insulated portion 102 and an axially extendable actuator portion 104. The insulated portion 102 of the insulated adjusting drive 100 may be connected to an upper end 43 of the electrically insulated support post 42. The use of an adjusting actuator 90 or 104 according to either of the above embodiments permits the angular orientation of the electrically insulated support post 42 to be adjusted relative to the upper beam assembly 28 while maintaining the electrically insulated status of the elongate conductor retainer 44 at a distal end of posts 42.

Figure 12:
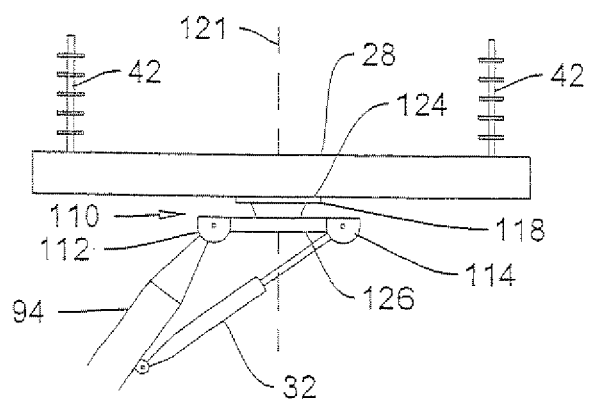
FIG. 12 is a side elevational view of a robotic arm of FIG. 2 having a rotatable upper beam assembly.
Figure 13:
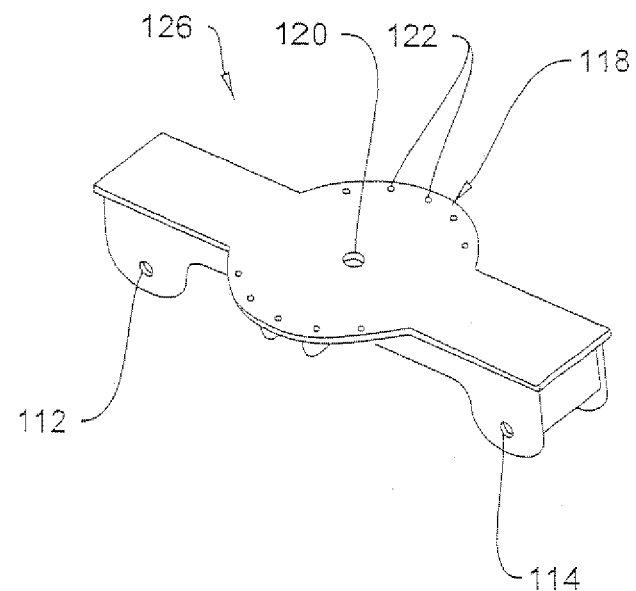
FIG. 13 is an isometric perspective view of the base member of the pivotable upper beam assembly of FIG. 12.

In a further embodiment as illustrated in FIG. 12, the robotic arm may further include a pivotal connection 110 for rotating the upper beam assembly 28 about a vertical axis 121 of rotation relative to the boom 22 of the support vehicle. The pivotal connection 110 comprises a base member 126 which pivotally supports upper beam assembly 28 thereon. As illustrated in FIG. 13 the base member 126 has first and second spaced apart parallel end connections 112 and 114, respectively and an orthogonally oriented horizontal pivot platform 118 therebetween. The pivot platform 118 includes a central pivot bore 120 and a plurality of mounting bores 122 radially spaced around the central pivot bore 120 through which pins (not shown) may be passed so as to rotatably fix the upper beam assembly 28 relative thereto. A central pivot such as a pivot pin (not shown) extends downwardly from the upper beam assembly 28 and is received in the central pivot bore 120. A wear plate 124 seen in FIG. 12, which may be formed of a wear resistant material, such as, Nylatron™, for example as well as other suitable materials may be located between the pivot platform 118 and the upper beam assembly 28.

Figure 14:
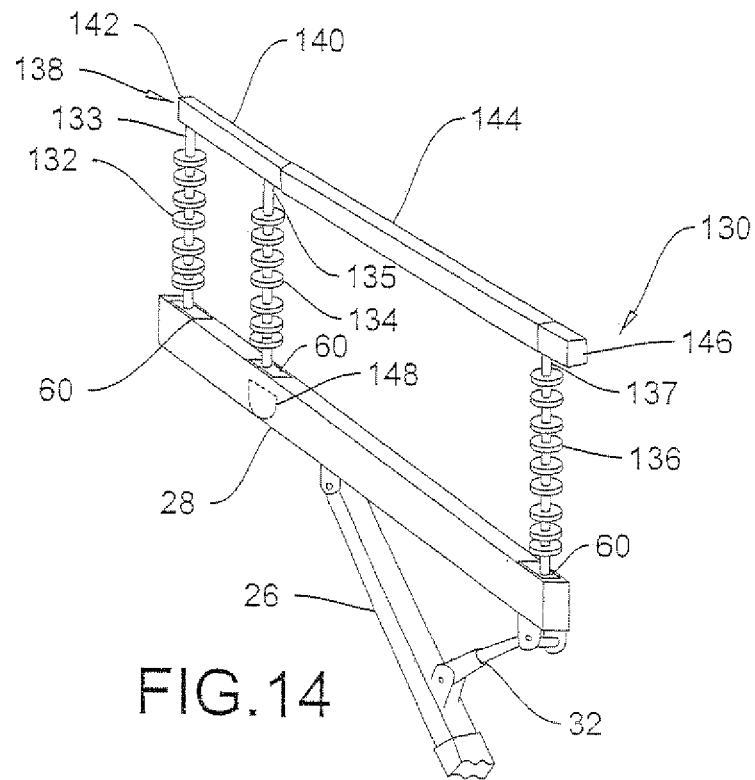
FIG. 14 is an isometric perspective view of a robotic arm of FIG. 2 supporting an air break switch.
Figure 15:
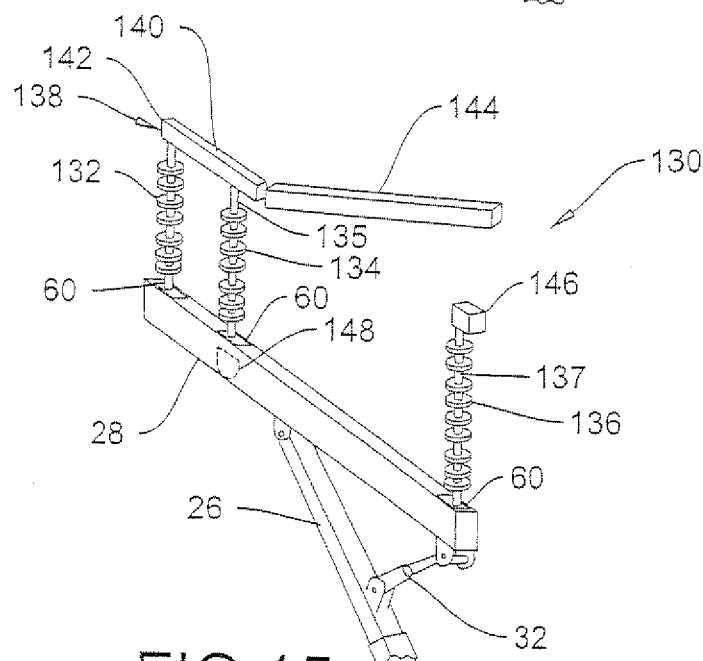
FIG. 15 is an isometric perspective view of the air break switch of FIG. 14 in the open position.

The upper beam assembly 28 may also support an air break switch 130 as illustrated in FIGS. 14 and 15. The air break switch 130 comprises an interruptible conductor, generally indicated at 138, and a plurality of electrically insulated support posts supporting the interruptible conductor 138 away from the upper beam assembly 28. As illustrated in FIGS. 14 and 15, the air break switch includes first, second and third electrically insulated support posts 132, 134 and 136, respectively. The interruptible conductor 138 comprises a stationary conductor portion 140 extending between free distal ends 133 and 135 of first and second electrically insulated support posts 132 and 134 and a rotatable conductor portion 144 extending from the free distal end 135 of the second electrically insulated support posts 134. The rotatable conductor portion 144 is selectively connectable to a distal end 137 of a third electrically insulated support post 136 so as to selectively complete the electrical connection between the distal ends of the first and third electrically insulated support posts. The stationary conductor portion 140 includes a first connection point 142 for connection to a first location in an electrical pathway while the third electrically insulated support post includes a second connection point 146 for connection to a second location in an electrical pathway.

The second electrically insulated support post 134 is rotatably connected to the upper beam assembly 28 wherein a motor 148 (shown in dotted outline in FIGS. 14 and 15) located within the upper beam assembly 28 may be utilized to rotate the second electrically insulated support post 134 relative to the upper beam assembly 28. As illustrated, the motor 148 is a hydraulic motor, however it will be appreciated that other motor types may also be utilized. Rotation of the rotatable conductor portion 144 causes the rotatable conductor portion to selectively make or break its contact with the second connection point 146 so as to selectively interrupt the electrical pathway. It will also be appreciated that although the rotatable conductor portion 144 is illustrated as being rotatable about the second electrically insulated support post 134 in FIGS. 14 and 15, the rotatable conductor portion may also be rotatable about the third electrically insulated support post 136. In this alternative embodiment rotation of the third electrically insulated support post 136 will cause the rotatable conductor portion 144 to make or break its electrical connection with the stationary conductor portion 140.

Figure 16:
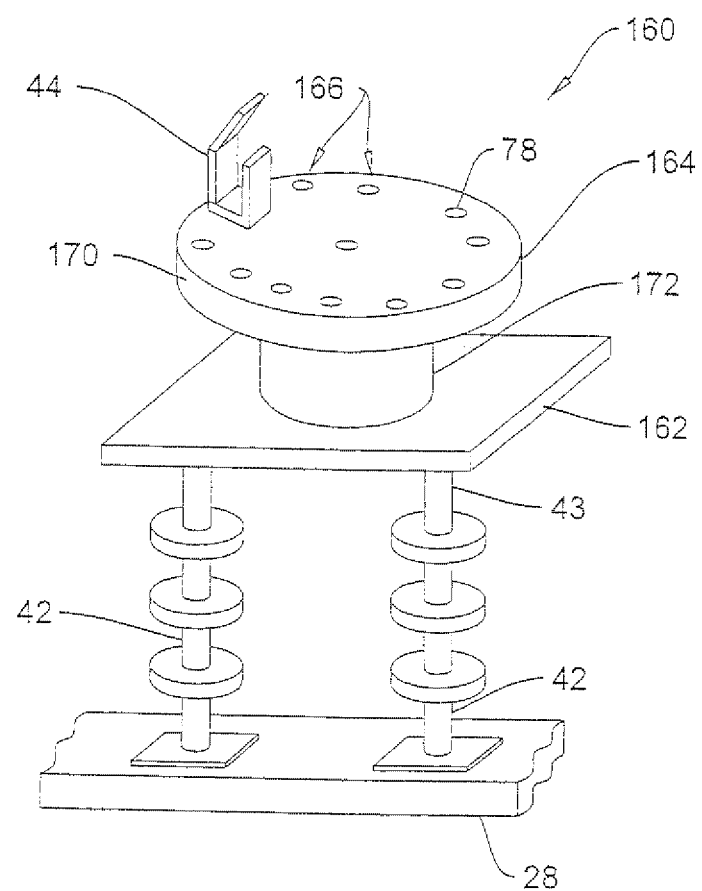
FIG. 16 is an isometric perspective view of a pair of electrically insulated support posts supporting a pivoting plate for supporting a plurality of elongate conductor retainers.

As illustrated in FIG. 16, two electrically insulated support posts 42 are each connected to a union assembly 160 having a to plate 162 and a pivoting plate 164 at the upper ends 43 thereof. The top plate 162 is fixedly secured to the upper ends 43 of the electrically insulated support posts 42. It will be appreciated however that the union assembly may be secured to a single electrically insulated support post 42 or more than two electrically insulated support posts as well.

The pivoting plate 164 includes a plurality of mounting positions 166 for receiving a plurality of elongate conductor retainers 44. The pivoting plate 164 may have an oval outer surface 170 wherein the plurality of mounting positions 166 may be arranged in an array proximate to the outer surface. It will be appreciated that other shapes for the outer surface 170 of the pivoting plate may also be useful as well. The mounting positions 166 may each comprise a single mounting bore 78 for pivotally securing the elongate conductor retainer 44 thereto. Optionally, the mounting position 166 may include a plurality of mounting bores arranged to correspond to the mounting bolts or bores on an elongate conductor retainer 44 for fixedly securing the elongate conductor retainer thereto. As illustrated in FIG. 16, the array of mounting positions 166 are arranged corresponding to the outer surface 170, although it will be appreciated other arrays such as radial and rectangular will also be useful. A wear plate 172 which may be formed of a wear resistant material, such as, Nylatron™, for example as well as other suitable materials is located between the top plate 162 and the pivoting plate 164. Accordingly, a plurality of elongate conductor retainers 44 may be secured to the pivoting plate 164 for selective orientation relative to the insulated support post and the upper beam assembly 28.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A boom mountable robotic arm for temporarily supporting energized electrical conductors comprising:
   a single elongate unitary beam adapted for coupling with an upper end of a boom,
   at least one electrically insulated support post coupled to beam adapted to temporarily support at least one energized electrical conductor,
   a first rotation coupling that provides selectively controllable rotation of said beam about a first axis of rotation and wherein said first axis of rotation extends between said beam and the upper end of the boom for rotation of said beam relative to said boom in a substantially vertical plane,
   wherein said at least one electrically insulated support post includes at least one conductor retainer for said temporary support of said at least one energized electrical conductor, said at least one conductor retainer pivotally mounted on said at least one electrically insulated support post for rotation about at least one corresponding second axis of rotation.

2. The boom mountable robotic arm of claim 1 wherein said at least one conductor retainer is a plurality of conductor retainers pivotally mounted on said at least one electrically insulated support posts for rotation about said second axis of rotation for each said conductor retainer of said plurality of conductor retainers.

3. The boom mountable robotic arm of claim 2 wherein said at least one electrically insulated support posts is a plurality of electrically insulated support posts.

4. The boom mountable robotic arm of claim 2 wherein said at least one electrically insulated support post supports said plurality of conductor retainers for pivoting of said plurality of conductor retainers about said second axis of rotation for each said conductor retainer.

5. The boom mountable robotic arm of claim 4 wherein said second axis of rotation for each said conductor retainer is single, common axis of rotation.

6. The boom mountable robotic arm of claim 5 wherein said plurality of conductor retainers are mounted on a rotatable platform, rotatable relative to said beam.

7. The boom mountable robotic arm of claim 6 wherein said rotatable platform is a rotary table.

8. The boom mountable robotic arm of claim 7 wherein said plurality of electrically insulated support posts are slidably mounted on said beam, and wherein at least two support posts of said plurality of electrically insulated support posts are mounted between said rotary table and said beam.

9. The boom mountable robotic arm of claim 1 wherein said at least one electrically insulated support post includes first and second support posts having corresponding second and third rotation couplings, said second and third rotation couplings having corresponding, substantially parallel, axes of rotation allowing distal ends of the first and second support posts, distal from said beam, to rotate towards or away from each other.

10. The boom mountable robotic arm of claim 1 further comprising a boom adaptor mountable to said upper end of the boom; and wherein said beam is an upper beam assembly rotatably mounted to said boom adaptor for rotation of said upper beam assembly about said first axis of rotation relative to said boom adaptor, said upper beam assembly supporting thereon said at least two electrically insulated support posts and wherein a conductor retainer is mounted on said distal end thereof; and wherein said first rotation coupling includes a selectively actuable leveling adjustor mounted so as to cooperate between said upper beam assembly and said boom adaptor for selectively adjusting an angular position of said upper beam assembly relative to said boom adaptor.

11. The boom mountable robotic arm of claim 10 wherein said second and third rotation couplings each include a respective actuator cooperating between said upper beam assembly and said at least two electrically insulated support posts for selective inclination of said at least two electrically insulated support posts relative to said upper beam assembly.

12. The boom mountable robotic arm of claim 11 wherein each said electrically insulated support post includes an insulated upright portion and a riser portion, said riser portion having a first end pivotably connected to said upper beam assembly and a second end supporting said insulated upright portion, and wherein each said respective actuator angularly extends from said second end of said riser portion to said upper beam assembly.

13. The boom mountable robotic arm of claim 11 wherein each said respective actuator includes an insulated portion and a lengthwise extendable portion, each said respective actuator angularly extending between a distal end of said insulated support post and said upper beam assembly.

14. The boom mountable robotic arm of claim 1 further including an interruptible conductor having first and second ends and a plurality of the electrically insulated support posts supporting said interruptible conductor away from said upper beam assembly.

15. The boom mountable robotic arm of claim 14 wherein said selectively interruptible conductor comprises a stationary conductor between said distal ends of first and second posts of said at least two electrically insulated support posts and a rotatable conductor extending from said distal end of said second post and being selectively connectable to a distal end of a third post of said at least two electrically insulated support posts.

\* \* \* \* \*